US011522200B2

(12) United States Patent
Yoo et al.

(10) Patent No.: US 11,522,200 B2
(45) Date of Patent: Dec. 6, 2022

(54) METHOD FOR MANUFACTURING CATALYST FOR FUEL CELL USING BLOOD OF SLAUGHTERED LIVESTOCK

(71) Applicant: KOREA INSTITUTE OF SCIENCE AND TECHNOLOGY, Seoul (KR)

(72) Inventors: Sung Jong Yoo, Seoul (KR); Hee-Young Park, Seoul (KR); So Young Lee, Seoul (KR); Hyun Seo Park, Seoul (KR); Jin Young Kim, Seoul (KR); Jong Hyun Jang, Seoul (KR); Hyoung-Juhn Kim, Seoul (KR); Pil Kim, Jeonju-si (KR); Yeonsun Sohn, Jeonju-si (KR); Jiho Lee, Jeonju-si (KR)

(73) Assignee: Korea Institute of Science and Technology, Seoul (KR)

( * ) Notice: Subject to any disclaimer, the term of this patent is extended or adjusted under 35 U.S.C. 154(b) by 426 days.

(21) Appl. No.: 16/710,336

(22) Filed: Dec. 11, 2019

(65) Prior Publication Data
US 2020/0411880 A1  Dec. 31, 2020

(30) Foreign Application Priority Data
Jun. 28, 2019  (KR) .................. 10-2019-0077989

(51) Int. Cl.
 *H01M 4/86* (2006.01)
 *H01M 4/96* (2006.01)
 *H01M 4/90* (2006.01)
(52) U.S. Cl.
 CPC ........... *H01M 4/8652* (2013.01); *H01M 4/90* (2013.01); *H01M 4/96* (2013.01)

(58) Field of Classification Search
None
See application file for complete search history.

(56) References Cited

FOREIGN PATENT DOCUMENTS

JP  2013206651 A  10/2013
KR  10-1161526 B1  7/2012

OTHER PUBLICATIONS

Maruyama et al., Carbonized hemoglobin functioning as a cathode catalyst for polymer electrolyte fuel cell, Chem. Mater., 2006, 18, 1303-1311 (Year: 2006).*

(Continued)

*Primary Examiner* — Coris Fung
*Assistant Examiner* — Keling Zhang
(74) *Attorney, Agent, or Firm* — Rabin & Berdo, P.C.

(57) ABSTRACT

The present disclosure is a method for manufacturing a catalyst for a fuel cell using the blood of slaughtered livestock. The method for manufacturing a catalyst for a fuel cell using the blood of slaughtered livestock of the present disclosure allows preparation of a catalyst for a fuel cell exhibiting high redox reaction activity and very superior durability as compared to a commercially available platinum catalyst through a very simple process of purification of the blood of slaughtered livestock and hydrothermal synthesis. In addition, the method is very economical in that a catalyst is prepared using the pure blood of livestock only without an artificial additive, waste disposal cost can be reduced by recycling the blood of livestock and a high-performance catalyst capable of replacing the expensive platinum catalyst can be prepared.

8 Claims, 5 Drawing Sheets

(56) References Cited

OTHER PUBLICATIONS

Hinson et al., A rapid method for preparing crystalline human hemoglobin and the separation of crystalline hemoglobin A in quantity, Biochemical and biophysical research communications, 1969, 35, 1 (Year: 1969).*
Titirici et al., A direct synthesis of mesoporous carbons with bicontinuous pore morphology from crude plant material by hydrothermal carbonization, Chem. Mater., 2007, 19, 4205-4212 (Year: 2007).*
ChemSrc, Hemoglobin, 2022 (Year: 2022).*
GUO ChaoZhong et al., "The structural changes of blood pyropolymers and their beneficial electrocatalytic activity toward oxygen reduction", Oct. 2013, vol. 58 No.30: 3698-3703.doi: 10.1007/s11434-013-5995-8.
Jack A. Hinson et al., "A Rapid Method for Preparing Crystalline Human Hemoglobin and the Separation of Crystalline Hemoglobin A in Quantity", vol. 35, No. 1, 1969. Department of Biology University of South Carolina Columbia, South Carolina 29208.
Jun Maruyama et al., "Hemoglobin Pyropolymer Used as a Precursor of a Noble-Metal-Free Fuel Cell Cathode Catalyst", J. Phys. Chem. C 2008, vol. 112, 2784-2790.

* cited by examiner

TEM image of (a) Blood-HT, (b) Blood-Toluene-HT, (c) Blood-HTC-HT, (d) Blood-Toluene-HTC-HT

METHOD FOR MANUFACTURING CATALYST FOR FUEL CELL USING BLOOD OF SLAUGHTERED LIVESTOCK

CROSS-REFERENCE TO RELATED APPLICATIONS

This application claims, under 35 U.S.C. § 119, the priority of Korean Patent Application No. 10-2019-0077989 filed on Jun. 28, 2019 in the Korean Intellectual Property Office, the disclosure of which is incorporated herein by reference in its entirety.

TECHNICAL FIELD

The present disclosure relates to a method for manufacturing a catalyst for a fuel cell using the blood of slaughtered livestock.

BACKGROUND

A fuel cell is an electrochemical energy conversion device which generates water and electricity from hydrogen and oxygen. Although it exhibits high energy conversion efficiency and is drawing attentions as an ecofriendly energy source, there are obstacles to commercialization due to low durability and high price. Because the high performance reported thus far has been achieved with platinum catalysts, the cost is relatively high. Therefore, in order to improve economic efficiency, development of an inexpensive non-precious metal electrode catalyst capable of replacing the existing precious metal-based catalysts for redox reactions is essential.

In the previously reported researches about non-precious metal-based catalysts, non-precious metal oxides, non-precious metal carbides, non-precious metal nitrides and composites thereof with heteroatom-doped carbon, nitrogen-doped carbon-non-precious metal composites (M-N—C; M=Fe, Co, Mn, Cu, etc.) and metal-free heteroatom-doped carbon-based materials have been proposed as alternative catalysts to precious metal-based catalysts for redox reactions. Among these, M-N—C is evaluated as the most promising in terms of redox reaction performance. Most of the M-N—C catalysts reported thus far use artificially synthesized polymers or compounds as precursors. It can be seen that the structures that can exhibit redox reaction activity are included organisms and waste biomass that can be easily found around us.

The high-activity sites in biomass include metal-macrocycle frameworks wherein a carbon support, a nitrogen source and a metal element are bound. Examples are heme in the blood of animals, hemin found in plants, cobalamin, or vitamin $B_{12}$, etc. Especially, blood has the Fe-porphyrin structure. It is known that F—N—C composites exhibit very high redox reaction performance.

Meanwhile, the ocean dumping of the blood of slaughtered pigs as waste resource was prohibited completely since 2016 according to the '1996 Protocol to the London Convention'. It shows high pollution indices with 1209 mg/L of BOD and 4221 mg/L of COD, and incurs high disposal cost. Because the amount of the blood of pigs slaughtered annually is as large as 49,054 ton (from September 2015 to October 2016), development of a high-performance catalyst using the blood of slaughtered pigs is of great importance environmentally and economically.

In order to synthesize a highly active catalyst of a metal nitride-carbon composite structure from biomass-derived materials, pretreatment and activation of biomass is essential. In particular, it is difficult to extract active ingredients from animal blood because it coagulates as soon as the animal is slaughtered. In addition, various compounds included in the coagulated blood, except for the active ingredient heme, lower the activity of the catalyst.

In order to synthesize a high-performance catalyst from hemoglobin included in blood, a process of forming a metal nitride-carbon composite structure is necessary. In addition, as the protein with a polypeptide structure is degraded, a cyclic carbon nitride structure is formed. Because the presence of a phospholipid, etc. with a long-chain carbon structure in blood may interfere with the formation of the metal nitride-carbon composite structure, a process of processing the same needs to be developed.

[References of the Related Art] [Patent Document] Korean Patent Registration Publication No. 10-1161526.

SUMMARY

The present disclosure is directed to a method for manufacturing a catalyst for a fuel cell, with a metal nitride-carbon composite structure, by removing impurities interfering with the synthesis of a catalyst from the blood of slaughtered livestock and conducting hydrothermal synthesis and heat treatment using pure blood only without addition of an artificial additive.

In an aspect, the present disclosure provides a method for manufacturing a catalyst for a fuel cell using the blood of slaughtered livestock, which includes: a step of separating red blood cells from the blood of slaughtered livestock; a step of extracting hemoglobin by mixing the separated red blood cells with an organic solvent; a step of preparing an iron nitride-carbon composite by conducting hydrothermal synthesis of the extracted hemoglobin; and a step of activating the iron nitride-carbon composite by conducting heat treatment.

In another aspect, the present disclosure provides a catalyst for a fuel cell manufactured by the manufacturing method.

In another aspect, the present disclosure provides an electrode including the catalyst for a fuel cell.

In another aspect, the present disclosure provides a fuel cell including the electrode.

The method for manufacturing a catalyst for a fuel cell using the blood of slaughtered livestock of the present disclosure allows preparation of a catalyst for a fuel cell exhibiting high redox reaction activity and very superior durability as compared to a commercially available platinum catalyst through a very simple process of purification of the blood of slaughtered livestock and hydrothermal synthesis. In addition, the method is very economical in that a catalyst is prepared using the pure blood of livestock only without an artificial additive, waste disposal cost can be reduced by recycling the blood of livestock and a high-performance catalyst capable of replacing the expensive platinum catalyst can be prepared.

DETAILED DESCRIPTION OF EMBODIMENTS

Figure 1:
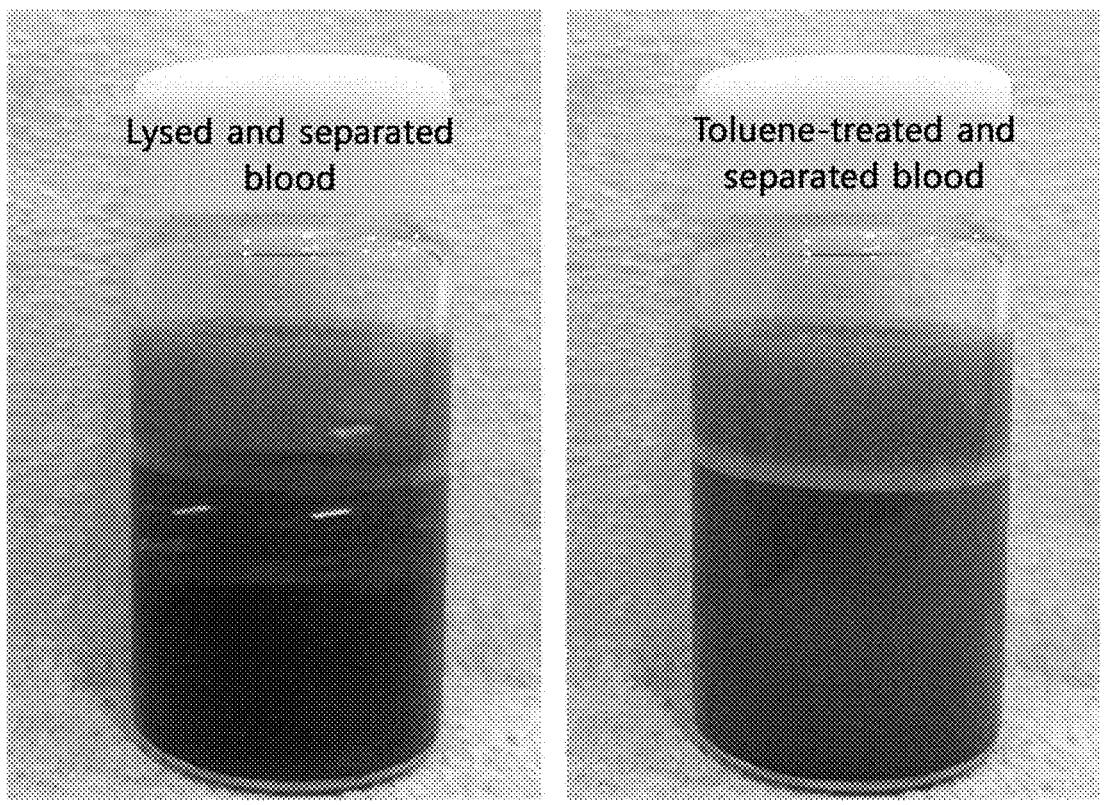
FIG. 1 shows the photographs of coagulated blood of slaughtered pig which has been separated by being lysed and left alone, and separated red blood cells which have been treated with toluene and then separated.

Hereinafter, various aspects and exemplary embodiments of the present disclosure are described in more detail.

An aspect of the present disclosure provides a method for manufacturing a catalyst for a fuel cell using the blood of slaughtered livestock, which includes: a step of separating red blood cells from the blood of slaughtered livestock; a step of extracting hemoglobin by mixing the separated red blood cells with an organic solvent; a step of preparing an iron nitride-carbon composite by conducting hydrothermal synthesis of the extracted hemoglobin; and a step of activating the iron nitride-carbon composite by conducting heat treatment.

Specifically, in the step of separating red blood cells from the blood of slaughtered livestock, coagulated blood of slaughtered livestock is lysed and then left alone, so that the blood is separated into three layers of plasma, fibrin and red blood cells due to the difference in specific gravity.

After obtaining iron-porphyrin (heme) including the $FeN_4$ structure and red blood cells of the polypeptide structure including amino acids such as lysine, alanine, histidine, etc., hemoglobin is extracted as a catalyst material with activity-inhibiting ingredients removed by dissolving the phospholipid later constituting the cell membrane of the red blood cells by treatment with an organic solvent.

The organic solvent may be one or more selected from toluene, xylene, EDTA, ether, chloroform and cyclohexane, and is not limited as long as the organic solvent is capable of separating phospholipids which are activity-inhibiting ingredients.

The organic solvent mixed with the separated red blood cells may be used together with distilled water, and the separated red blood cells, the distilled water and the organic solvent may be mixed at a volume ratio of 1:0.1-2:0.1-1. The volume ratio may be specifically 1:0.5-1.5:0.2-0.6, more specifically 1:0.8-1.2:0.3-0.5. Outside the volume ratio of 1:0.1-2:0.1-1, the phospholipids may not be removed effectively.

Next, a catalyst for a fuel cell with a cyclic iron nitride-carbon composite structure is synthesized by degrading and reconstituting the polypeptide structure through hydrothermal synthesis of the extracted hemoglobin, and the performance of the catalyst is improved by activating the catalyst through pyrolysis.

The hydrothermal synthesis may be conducted in an autoclave at 120-250° C. for 6-36 hours. If the temperature is below the above range, it is difficult to form the structure. And, if the temperature exceeds the range, the blood may be carbonized. If the time is below the above range, the hydrothermal synthesis may not be conducted sufficiently. And, if the time exceeds the range, it may be difficult to form the effective structure of the catalyst.

And, the hydrothermal synthesis may be conducted by diluting the extracted hemoglobin in distilled water to a concentration of 10-99 vol %. When the hemoglobin is distilled with distilled water, an effect of synthesizing the catalyst uniformly may be achieved.

The heat treatment may be conducted using one or more selected from hydrogen, ammonia, argon and nitrogen at 300-1000° C.

Although not explicitly described in the following example or comparative examples, catalysts for a fuel cell were prepared while varying the conditions of the method for manufacturing a catalyst for a fuel cell using the blood of slaughtered livestock according to the present disclosure and the redox reaction activity, durability and yield of the prepared catalysts were measured.

As a result, it was confirmed that a catalyst with high redox reaction activity, superior durability and remarkably improved yield can be obtained when all of the following conditions are satisfied:

(i) the organic solvent is toluene, (ii) the organic solvent mixed with the separated red blood cells is used together with distilled water, and the separated red blood cells, the distilled water and the organic solvent are mixed at a volume ratio of 1:0.8-1.2:0.3-0.5, (iii) the hydrothermal synthesis is conducted in an autoclave at 180-220° C. for 18-30 hours, (iv) the hydrothermal synthesis is conducted by diluting the extracted hemoglobin in distilled water to a concentration of 10-20 vol %, (v) the heat treatment is conducted at 800-1000° C. under a nitrogen atmosphere.

It was confirmed that the yield of the catalyst may decrease if any one of the above conditions is not satisfied.

Another aspect of the present disclosure provides a catalyst for a fuel cell manufactured by the manufacturing method.

Another aspect of the present disclosure provides an electrode including the catalyst for a fuel cell.

Another aspect of the present disclosure provides a fuel cell including the electrode.

Hereinafter, specific examples are presented to help understanding the present disclosure. However, the examples are for illustrative purposes only and the scope of this disclosure is not limited by them. It will be apparent to those of ordinary skill in the art that various changes and modifications can be made within the scope of the present disclosure.

Example 1. Synthesis of Catalyst for Redox Reaction Using Blood of Slaughtered Pig (Blood-Toluene-HTC-HT)

Coagulated blood of slaughtered pig (1 kg, Nonghyup Moguchon) was lysed and left alone to separate the blood of slaughtered pig into three layers of plasma, fibrin and red blood cells from top to bottom. The red blood cells located at the lowermost layer of the separated blood of slaughtered pig were mixed with distilled water and toluene. The red blood cells, the distilled water and the toluene were mixed at a volume ratio of separated blood of slaughtered pig: distilled water:toluene=1:1:0.4. After stirring the mixture for 12 hours, three layers of toluene, phospholipid and hemoglobin were separated from top to bottom.

FIG. 1 shows the photographs of the coagulated blood of slaughtered pig which were separated by being lysed and left alone, and separated red blood cells were treated with toluene and then separated.

The hemoglobin layer was separated and diluted with distilled water (15 vol %). Then, hydrothermal synthesis was conducted in an autoclave (200° C., 24 hours). After the reaction was completed, a catalyst in powder form was obtained by washing with ethanol and drying in an oven at 80° C. for 24 hours. A catalyst for redox reaction (Blood-Toluene-HTC-HT) was synthesized by heat-treating the obtained catalyst in a furnace (at 900° C. under nitrogen atmosphere).

Comparative Example 1. Synthesis of Blood-HT

A catalyst was synthesized in the same manner as in Example 1 except that the separated red blood cells were mixed with distilled water at a volume ratio of red blood cells:distilled water=1:1 except toluene, and hydrothermal synthesis was not conducted.

Comparative Example 2. Synthesis of Blood-HTC-HT

A catalyst was synthesized in the same manner as in Example 1 except that the separated red blood cells were mixed with distilled water at a volume ratio of red blood cells:distilled water=1:1 except toluene.

Comparative Example 3. Synthesis of Blood-Toluene-HT

A catalyst was synthesized in the same manner as in Example 1 except that hydrothermal synthesis was not conducted.

Test Example 1. X-Ray Diffraction (XRD) Analysis

Figure 2:
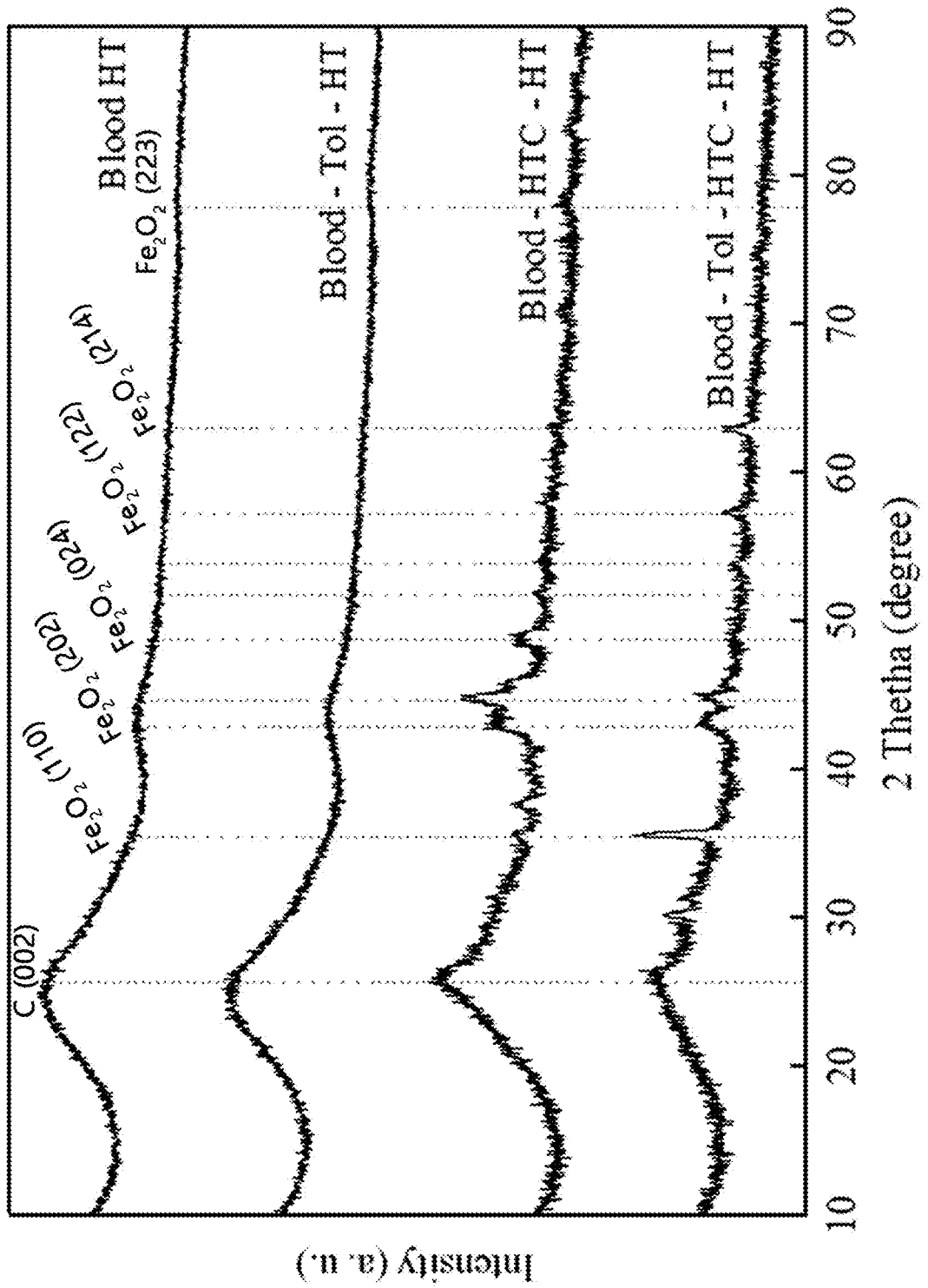
FIG. 2 shows an X-ray diffraction analysis result of catalysts of Example 1 and Comparative Examples 1-3 of the present disclosure.

X-ray diffraction analysis was conducted to analyze the structure of the catalysts of Example 1 and Comparative Examples 1-3, and the result is shown in FIG. 2. As can be seen from FIG. 2, no characteristic peak was observed other than carbon for Comparative Examples 1 and 3 wherein hydrothermal synthesis was not conducted. The characteristic peak of iron oxide was observed for Comparative Example 2 wherein hydrothermal synthesis was conducted. The crystallinity was more distinct for Example 1 wherein hydrothermal synthesis and toluene treatment were conducted.

Test Example 2. Transmission Electron Microscopic (TEM) Analysis

Figure 3:
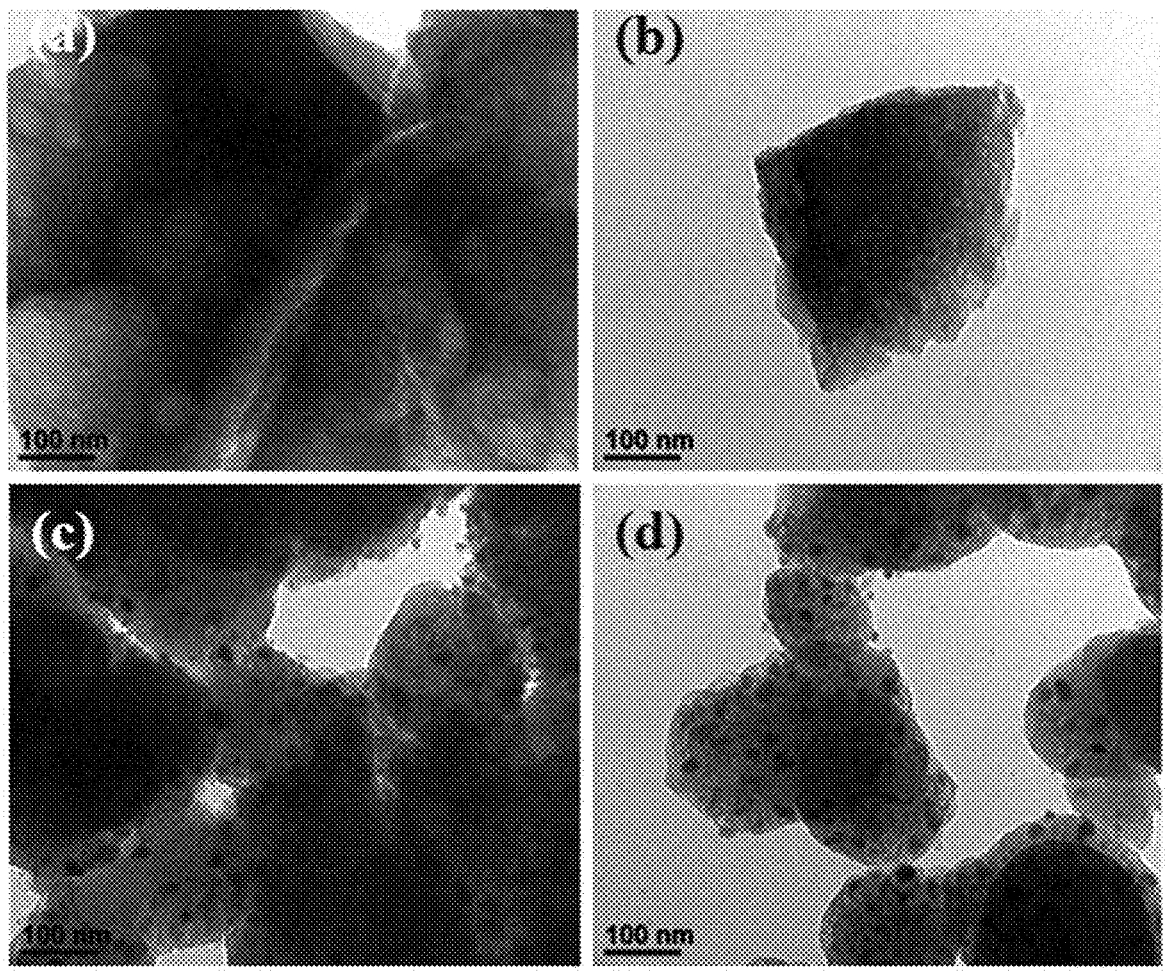
FIG. 3 shows images showing a transmission electron microscopic analysis result of catalysts of Example 1 and Comparative Examples 1-3 of the present disclosure.

Transmission electron microscopic (TEM) analysis was conducted to analyze the structure of the catalysts of Example 1 and Comparative Examples 1-3, and the result is shown in FIG. 3. As can be seen from FIG. 3, the catalysts of Comparative Examples 1 and 3 where hydrothermal synthesis was not conducted had morphologies of a planar structure. The catalysts of Example 1 and Comparative Example 2 where hydrothermal treatment was conducted showed small particles supported on the support surface, which corresponded to the iron oxide observed in the X-ray diffraction analysis.

Test Example 3. Measurement of Redox Reaction Activity

Figure 4:
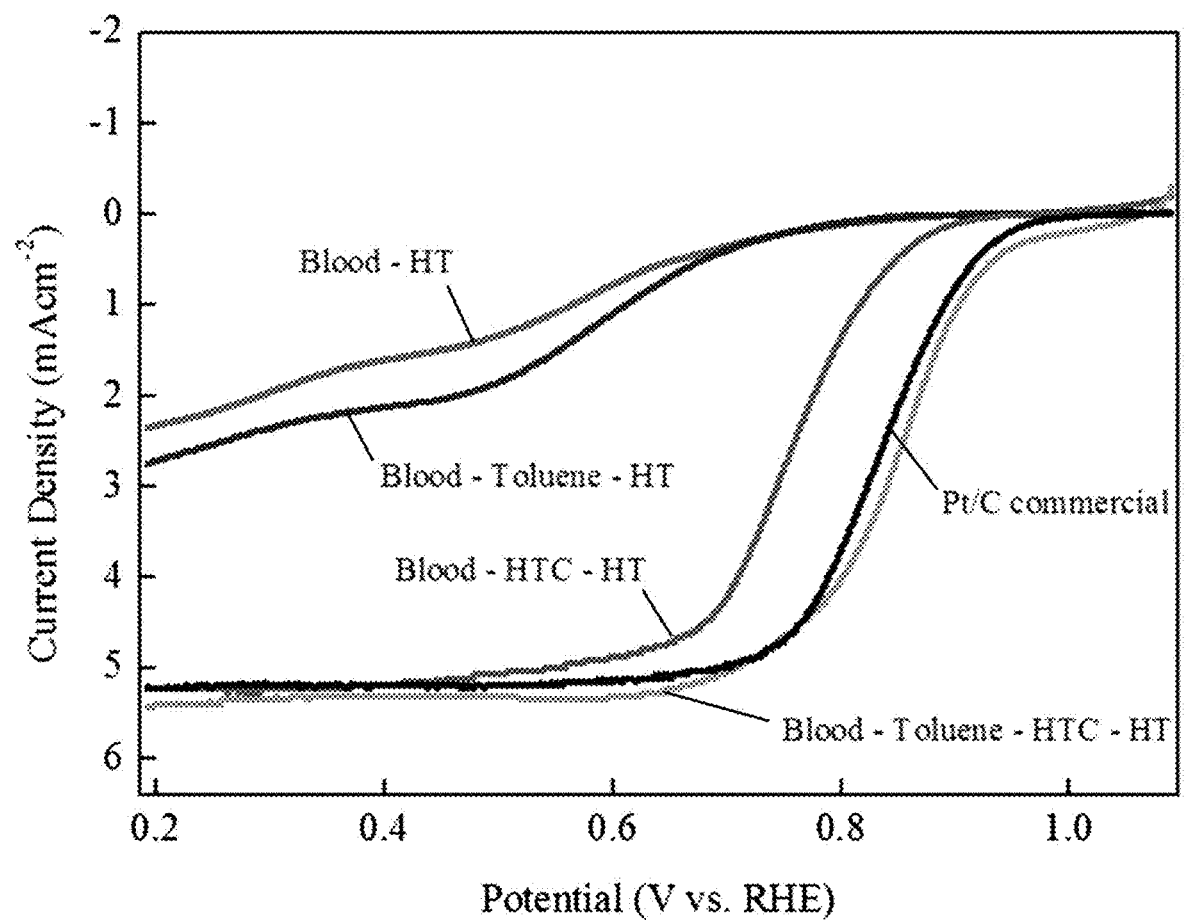
FIG. 4 shows the redox reaction polarization curves of catalysts of Example 1 and Comparative Examples 1-3 of the present disclosure and a commercially available platinum catalyst.

The redox reaction activity of the iron nitride-carbon composite structure catalysts prepared in Example 1 and Comparative Examples 1-3 and a commercially available platinum catalyst was measured by linear sweep voltammetry (LSV) using a potentiostat, and the result is shown in FIG. 4.

A 0.1 M KOH aqueous solution purged with oxygen for 1 hour was used as an electrolyte for measurement, and glassy carbon as a working electrode was coated with the catalyst.

As a result, the catalysts of Comparative Examples 1 and 3 where hydrothermal synthesis was not conducted showed little activity. The catalyst of Comparative Example 2, which was not treated with toluene, showed improved activity over Comparative Examples 1 and 3, but the activity was lower than that of the commercially available platinum catalyst. The catalyst of Example 1, wherein hydrothermal synthesis and heat treatment were conducted after removing phospholipids through toluene treatment, showed significantly improved redox reaction activity, which was better than that of the commercially available platinum catalyst.

Test Example 4. Evaluation of Catalyst Durability

Figure 5:
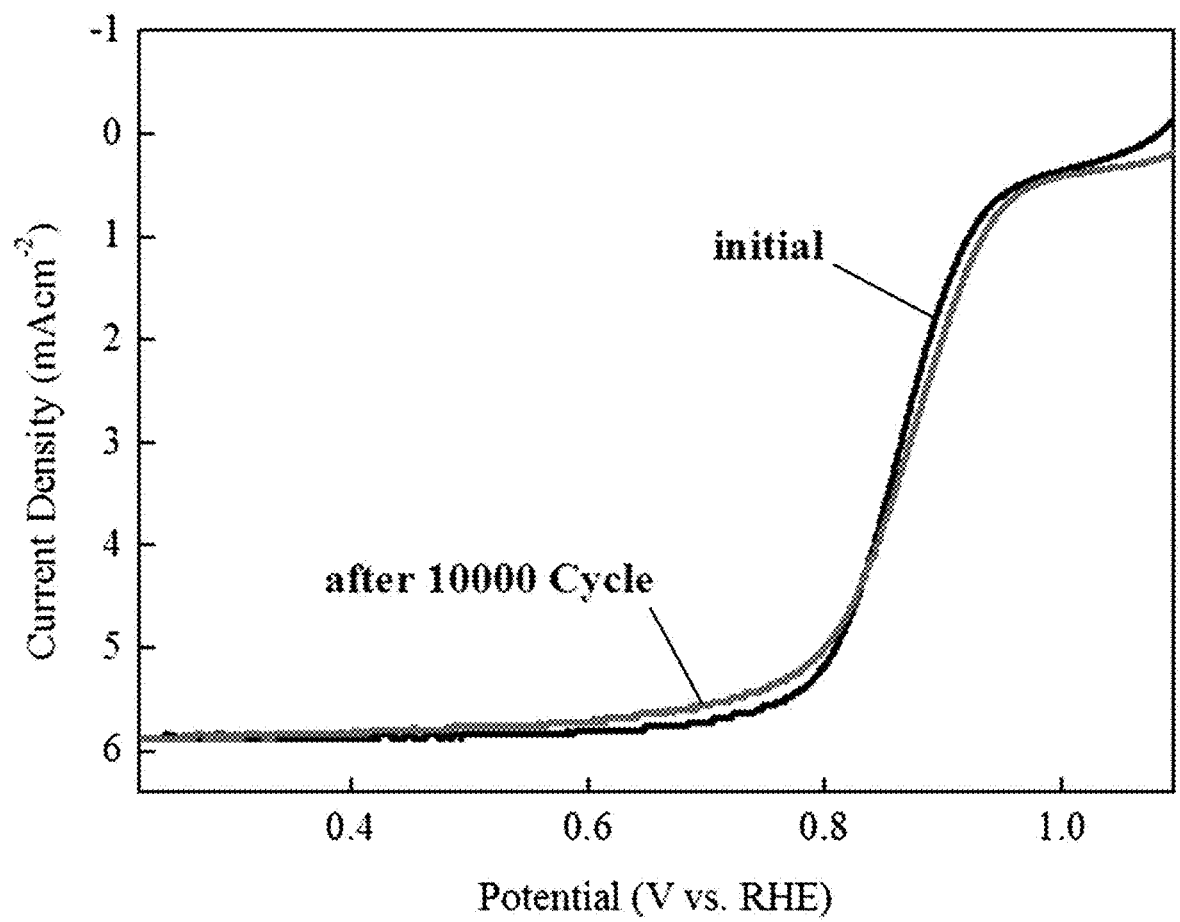
FIG. 5 shows a result of evaluating the durability of a catalyst of Example 1 of the present disclosure.

Durability test was conducted for the iron nitride-carbon composite structure catalyst prepared in Example 1 under a half-cell condition, and the result is shown in FIG. 5.

A redox reaction polarization curve was obtained after 10,000 cycles of cyclic voltammetry in a range from 0.7 to 1.1 V. As a result, it was confirmed that the catalyst of Example 1 had very superior durability with performance decreased by about 5.4%.

Therefore, the method for manufacturing a catalyst for a fuel cell using the blood of slaughtered livestock according to the present disclosure allows preparation of a catalyst for a fuel cell exhibiting high redox reaction activity and very superior durability as compared to a commercially available platinum catalyst through a very simple process of purification of the blood of slaughtered livestock and hydrothermal synthesis. In addition, the method is very economical in that a catalyst is prepared using the pure blood of livestock only without an artificial additive, waste disposal cost can be reduced by recycling the blood of livestock and a high-performance catalyst capable of replacing the expensive platinum catalyst can be prepared.

The example and comparative examples described above are for illustrative purpose only and the present disclosure is not limited thereby. Because those of ordinary skill in the art to which the present disclosure belongs can carry out the present disclosure by variously changing them, the scope of technical protection of the present disclosure shall be defined by the appended claims.

What is claimed is:

1. A method for manufacturing a catalyst for a fuel cell using the blood of slaughtered livestock, comprising:
   i) separating red blood cells from the blood of slaughtered livestock;
   ii) extracting hemoglobin from the separated red blood cells by mixing with an organic solvent;
   iii) preparing an iron nitride-carbon composite by conducting hydrothermal synthesis on the extracted hemoglobin; and
   iv) activating the iron nitride-carbon composite by conducting heat treatment thereby producing the catalyst.

2. The method for manufacturing a catalyst for a fuel cell according to claim 1, wherein the organic solvent is one or more selected from toluene, xylene, EDTA, ether, chloroform and cyclohexane.

3. The method for manufacturing a catalyst for a fuel cell according to claim 1, wherein the separated red blood cells, distilled water, and the organic solvent are mixed at a volume ratio of 1:0.1-2:0.1-1.

4. The method for manufacturing a catalyst for a fuel cell livestock according to claim 1, wherein the hydrothermal synthesis at step iii is conducted in an autoclave at 120-250° C. for 6-36 hours.

5. The method for manufacturing a catalyst for a fuel cell according to claim 1, wherein the hydrothermal synthesis on the extracted hemoglobin is conducted by diluting the extracted hemoglobin in distilled water to a concentration of 10-99 vol %.

6. The method for manufacturing a catalyst for a fuel cell according to claim 1, wherein the heat treatment is conducted under an atmosphere of one or more gases selected from hydrogen, ammonia, argon and nitrogen.

7. The method for manufacturing a catalyst for a fuel cell according to claim 1, wherein the heat treatment is conducted at 300-1000° C.

8. The method for manufacturing a catalyst for a fuel cell according to claim 1, wherein
   the organic solvent is toluene, further wherein the separated red blood cells, distilled water, and the toluene are mixed at a volume ratio of 1:0.8-1.2:0.3-0.5,
   the extracted hemoglobin at step ii) is diluted in distilled water to a concentration of 10-20 vol %, and the hydrothermal synthesis is conducted in an autoclave at 180-220° C. for 18-30 hours, and
   the heat treatment is conducted at 800-1000° C. under a nitrogen atmosphere.

\* \* \* \* \*